United States Patent [19]

Ward

[11] 3,860,569

[45] Jan. 14, 1975

[54] TREATMENT OF TALL OIL FATTY ACIDS

[75] Inventor: Benjamin F. Ward, Isle of Palms, S.C.

[73] Assignee: Westvaco Corporation, New York, N.Y.

[22] Filed: Dec. 20, 1973

[21] Appl. No.: 426,503

Related U.S. Application Data

[63] Continuation-in-part of Ser. No. 216,226, Jan. 7, 1972.

[52] U.S. Cl. .............................. 260/97.5, 260/108
[51] Int. Cl. ............................................... C09f /807
[58] Field of Search ......................... 260/97.5, 108

[56] References Cited
UNITED STATES PATENTS

| | | | |
|---|---|---|---|
| 1,957,788 | 5/1934 | Lister | 260/108 |
| 3,157,629 | 11/1964 | Patrick | 260/97.6 |

*Primary Examiner*—Melvyn I. Marquis
*Assistant Examiner*—William E. Parker
*Attorney, Agent, or Firm*—Richard L. Schmalz; Ernest B. Lipscomb, III

[57] ABSTRACT

A process is disclosed for treating tall oil fatty acids. The process comprises treating tall oil fatty acids with a bromine-iodine catalyst to convert the linoleic acid portion to oleic and other acids. The catalyst is employed in an amount of 0.06 percent to 2.0 percent by weight fatty acids at a temperature between 400°F. and 550°F. for a period of time between 10 minutes and 6 hours. The bromine-iodine catalyst is used at a bromine to iodine ratio of between 1:1 to 5:1 parts by weight. Tall oil fatty acids treated with the bromine-iodine catalyst of this invention give fatty acids almost identical to fatty acids treated with iodine alone. The advantage of this process is that less iodine catalyst is used to accomplish equivalent results as with iodine alone.

3 Claims, No Drawings

TREATMENT OF TALL OIL FATTY ACIDS

CROSS-REFERENCE TO RELATED APPLICATION

This application is a continuation-in-part of copending application, Ser. No. 216,266, filed Jan. 7, 1972.

BACKGROUND OF THE INVENTION

1. Field of the Invention

This invention relates to a process for the modification to tall oil fatty acids. More particularly, this invention relates to a process for treating tall oil fatty acids with a bromine-iodine catalyst.

Tall oil fatty acids normally consist of a major portion of mono-unsaturated oleic acids and diunsaturated linoleic acids (in approximately equal proportions), small quantities of saturated acids and unsaponifiables. Also, since tall oil fatty acids are derived from tall oil, which contains substantial quantities of rosin acids, small quantities of the latter may also be present. The Bureau of the Census of the U.S. Department of Commerce has accepted the definition of "tall oil fatty acids" as that material produced from crude tall oil which contains 90 percent or more free fatty acids. Most commercially available tall oil fatty acids contain substantially more than 90 percent fatty acids and substantially less than 10 percent rosin acids. The following is an analysis of typical tall oil fatty acids:

| Component | Percent by Weight |
|---|---|
| Saturated acids | 4 |
| Oleic acids | 46 |
| Linoleic acids | 43 |
| Other fatty acids | 2 |
| Unsaponifiables | 1 |
| Rosin Acids | 4 |
| | 100 |

In the effort to employ tall oil fatty acids as starting materials for the manufacture of detergents, as by sulfonation for example, the large amount of polyunsaturated linoleic acids in the tall oil fatty acids is found to be detrimental since they give rise to side reactions with the formation of undesirable products, and therefore have not found wide acceptance for such use. The unsaturated linoleic acid must therefore be converted to oleic acid and other saturated acids.

2. The Prior Art

It is well known to upgrade tall oil components by heating them in the presence of various catalysts. For instance, disproportionation of rosin acids is disclosed in U.S. Pat. No. 2,617,792 to Floyd wherein nickel is used as the catalyst. A free hydrogen chloride and zinc halide catalyst for polymerizing fatty acid mixtures is disclosed in U.S. Pat. No. 2,894,939 to Hampton. More pertinent is the disclosure of stabilizing tall oil materials containing substantial amounts of rosin acids with an iodine catalyst by disproportionation disclosed in U.S. Pat. No. 2,311,386 to Hasselstrom. In such processes, the tall oil starting material contains a relatively large portion of rosin acids, and is subjected to heat in the presence of a catalyst, whereupon hydrogen is generated largely from the rosin acids, especially those coming under the designation "abietic acid" and serves to hydrogenate the other rosin acids and the unsaturated fatty acids as well. This reaction above referred to is known as disproportionation and yields a product in which the polyunsaturated fatty acids originally present are hydrogenated. Because of the relatively large amount of hydrogen generated, however, the reaction produces little or no dimerization of the unsaturated fatty acids for the reasons mentioned hereinabove. Thus Floyd, for example, in Column 3, beginning line 20, states that to carry out the disproprotionation reaction requires a minimum of about 30 percent of rosin acids. In the disproportionation process covered by the Hasselstrom patent above cited, substantially the same results are sought as in the Floyd patent.

The treatment of tall oil fatty acids with an iodine catalyst to convert the linoleic acids to oleic-type acids is disclosed in U.S. Pat. No. 2,157,629 to Patrick. Disproportionation of rosin with halogen catalysts is taught in U.S. Pat. No. 1,957,788 to Lister. Also, in U.S. Pat. No. 3,251,869 to Putnam et al. unsaturated fatty acids are treated with an iodine catalyst followed by treatment with a clay catalyst. Other somewhat related prior art patents teach using iodine catalysts to isomerize polyene compounds, such as Ralston et al. U.S. Pat. Nos. 2,411,111 and 2,411,112, as well as 2,411,113, and 2,498,133.

Although an iodine catalyst performs satisfactorily in the upgrading of tall oil products, it has become undesirable to rely solely on an iodine catalyst, as the short supply of iodine has resulted in that catalyst becoming more expensive. It is therefore a general object of this invention to provide a catalyst system for treating tall oil fatty acids that is equally satisfactory as an iodine catalyst. Another object of this invention is to provide a catalyst system for converting unsaturated linoleic acids in tall oil fatty acid to oleic type acids using lower catalyst levels.

Other objects, features and advantages of this invention will be evident from the following disclosure.

SUMMARY OF THE INVENTION

It has been found that a process for treating tall oil fatty acids with a bromine-iodine catalyst mixture to convert the linoleic acids portion to oleic and other fatty acids results in products equivalent to those treated with iodine alone. The catalysts are employed in an amount of 0.06 percent to 2.0 percent by weight fatty acids at a temperature between 400°F. and 550°F. for a period of time between 10 minutes and 6 hours. The bromine catalyst and iodine catalyst are used at a bromine to iodine ratio between 1:1 to 5:1 parts by weight. Tall oil fatty acids with the catalyst of this invention give fatty acids almost identical to fatty acids treated with iodine alone. The advantage of this process is that substantially less catalyst is used to accomplish equivalent results as with iodine alone.

DETAILED DESCRIPTION OF THE INVENTION

In carrying out the process of this invention the bromine catalyst and iodine catalyst together may be used in concentrations as low as 0.06 percent by weight of the fatty acids and as high as 2.0 percent by weight. At lower concentrations of iodine the conversion of the polyunsaturated acids proceeds at a rate too slow for practical use. As the amount of iodine catalyst is increased, the rate at which conversion of the polyunsaturated acids occurs is also increased. Certain advantages are to be had, however, by the use of low concentrations of iodine, i.e., from 0.03 percent to 0.05 percent; however, it is preferable that the iodine catalyst be present in an amount of at least 0.02 percent by weight of fatty acids. Also, low concentrations of iodine do not force the reaction to proceed so far that large amounts of saturated acids are formed, whereas the use of high concentrations of iodine, 1 percent to 2 percent, results in the formation of substantial quantities of saturated acids. Although various ratios of bromine to iodine might be utilized in the treatment of fatty acids, the best ratios seem to be about 1:1 to 5:1 parts bromine to iodine.

The bromine catalyst and iodine catalyst may be mixed together before they are added to the fatty acid, or they may be added separately or at the same time. In any event, the catalyst, whichever source, reacts together in the following equilibrium reaction when an excess of bromine is present:

$$I_2 + Br_2 \rightleftharpoons IBr + Br_2$$

The combination IBr as used herein is referred to as a mixture. The source of iodine catalyst may be as free iodine or such iodine sources as amine hydroiodides, for example, ammonium iodide. Other iodine compounds which breakdown and react according to the reaction above include aliphatic organic iodides, for example, propyl iodide and inorganic iodides, for example, aluminum iodide. As stated, the source of the iodine catalyst is not really a concern as it forms iodine during the disproportionation reaction. The source of free bromine which acts as a catalyst is not critical. Such sources as ammonium bromide and others may be used.

In a series of reactions of distilled tall oil fatty acids with bromine, it was found that the percentage of conjugated linoleic acid never exceeded about 3 percent; whereas, the non-conjugated linoleic acid appeared to react very slowly. The reverse situation is true when iodide is used as the catalyst; the non-conjugated linoleic acid is converted rapidly to conjugated linoleic acid but the disproportionation reaction proceeds slowly. Thus, iodine is a much better isomerization catalyst (linoleic acid to conjugated linoleic acid) than is bromine, but bromine is superior to iodine as a disproportionation catalyst (conjugated linoleic acid to oleic acid). Consequently, using a mixture of these two catalyst, a synergistic catalytic effect was discovered, i.e., less of the catalyst mixture was required for reaction than would be required for either catalyst alone.

It is also possible according to this invention, to produce from tall oil fatty acids having an iodine value of 135, products having an iodine value of 80 (roughly equivalent to that of commercial grades of oleic acid), in as short a time as 10 to 15 minutes, using high concentration of bromine-iodine catalyst. With 0.13 percent of the mixed catalyst (bromine/iodine, 3.3/1) the treatment of distilled tall oil fatty acids was complete in one hour at 495°F. The thus treated distilled tall oil fatty acid was sparged with steam for 30 minutes to give a product containing 74 percent oleic-type acid. Similar results are obtained using 4:1 and 5:1, bromine to iodine ratios. Characterization of these materials shows that they are equivalent to or superior to tall oil fatty acids treated with iodine alone in acid number, saponification value, diene, yield, and titer.

Distillation under vacuum of the products produced by the heating of the tall oil fatty acids with bromine-iodine mixture permits easy separation of the fatty acids from the dimerized acids. The fatty acids fraction having a high concentration of oleic acid therein can be used in most applications where commercial grades of oleic acid are employed. The dimerized acid fraction finds wide use in plastics and coating applications.

In carrying out this invention, superior results are to be had by the use of pressure of 10 p.s.i. to 40 p.s.i. in the heating operation. For example, the same degree of conversion can be obtained by using 0.10 percent catalyst mixture with 12 p.s.i. pressure as can be obtained by using 0.2 percent iodine with no pressure. Thus, the optimum pressure to be used is dependent upon the amount of catalyst used, and in most circumstances, autogeneous pressure is sufficient. At concentrations of 0.2 percent and 1 percent catalyst, 20 and 30 p.s.i. pressure, respectively, may be used effectively. Depending upon the amount of catalyst used, the temperature and the pressure, the time of treatment will ordinarily vary from 10 minutes to 6 hours.

As above stated, temperatures between 400°F. and 550°F. may be satisfactorily used. Above 550°F. side reactions occur to such a large degree that a uniform product is not obtained; below 400°F. the in situ hydrogenation occurs at too slow a rate to be of practical use. The optimum temperature may be taken as approximately 500°F. at which the linolenic and linoleic acids are converted almost as rapidly as at the higher temperatures but without discernible side reactions.

The practice of this invention may be seen from the following examples.

EXAMPLE 1

The synergistic effect of the bromine-iodine mixed catalyst is illustrated in the table below. In these reactions the tall oil fatty acids were reacted with various catalyst levels at 485°F. in a closed reaction vessel. The mixed catalyst of Samples E–G were made prior to adding to the fatty acid by dissolving iodine granules in liquid bromine to form iodine monobromide.

| Sample No. | A | B | C | D | E | F | G |
|---|---|---|---|---|---|---|---|
| Catalyst Level by weight of fatty acid | | | | | | | |
| % $I_2$ | .125% | .15% | .2% | 0 | .05% | .03% | .05% |
| % $Br_2$ | 0 | 0 | 0 | .2% | .075% | .095% | .05% |
| % Total Catalyst | .125% | .15% | .2% | .2% | .125% | .125% | .10% |
| % linoleic acid in starting material | 43.2% | 43.2% | 43.2% | 43.2% | 43.2% | 43.2% | 43.2% |
| % linoleic acid after one hour | 18.8% | 16.3% | 5.5% | * | 3.9% | 4.8% | 12.3% |
| % linoleic acid after two hours | 12.4% | 8.4% | 3.0% | 27% | * | * | 4.8% |

NOTES: * No reading taken.

As is shown above, the mixed catalyst system is much more effective, that is, it gives a much faster rate of disproportionation than either bromine or iodine alone.

EXAMPLE 2

Samples of distilled tall oil fatty acids were treated in a one liter laboratory autoclave. The catalysts were added to the samples at room temperature, the autoclave was closed and heated at 485°F. for 2 hours. An analysis of the resulting cooks was made by GLC and compared to a sample of the starting materials. The results are shown in the table below wherein the "control" sample is the starting material, distilled tall oil fatty acid.

| Sample No. | | Control | 1 | 2 | 3 |
|---|---|---|---|---|---|
| Catalyst Level by weight of fatty acid | | | | | |
| | %, $I_2$ | — | 0.2 | — | — |
| | %, $Br_2$ | — | — | 0.4 | 0.5 |
| Analysis, | (GLC) % | | | | |
| | Saturated acids | 6.5 | 9.1 | 9.5 | 10.4 |
| | Oleic acid | 44.2 | 75.2 | 64.7 | 71.8 |
| | Non-conjugated linoleic acid | 32.2 | 1.1 | 16.4 | 0.5 |
| | Conjugated linoleic acid | 11.0 | 3.7 | 0.7 | 0.9 |
| | Others | 6.1 | 11.9 | 8.7 | 16.4 |

The fatty acid analysis is given so that they equal 100 percent; however, it should be realized there are some dimer acids present. Sample 1 is illustrative of the best known catalyst of the prior art, that shown in U.S. Pat. No. 3,157,629. From treated samples 2 and 3, it is shown that bromine is an effective catalyst but that the higher catalyst level (sample 3) must be used to get almost complete conversion when bromine is used alone.

EXAMPLE 3

This example illustrates the effectiveness of a mixture of bromine and iodine as a catalyst. The starting material for this example was the same as for Example 2 and the heating and time identical. The mixture of bromine and iodine catalyst was varied as shown in the table below. Analyses of the samples are shown.

| Sample No. | 4 | 5 | 6 | 7 | 8 |
|---|---|---|---|---|---|
| Catalyst level, % by weight of fatty acid | | | | | |
| Ratio $Br_2/I_2$ | 1/1 | 3.3/1 | 5/1 | 5/1 | — |
| %, $I_2$ | 0.05 | 0.03 | 0.03 | 0.025 | 0.2 |
| %, $Br_2$ | 0.05 | 0.1 | 0.15 | 0.125 | — |
| Total catalyst | 0.10 | 0.13 | 0.18 | 0.15 | 0.2 |
| Analysis, (GLC) % | | | | | |
| Saturated acids | 8.1 | 9.7 | 8.9 | 10.6 | 9.1 |
| Oleic acid | 79.8 | 73.8 | 76.4 | 79.0 | 75.2 |
| Nonconjugated linoleic acid | — | — | — | — | — |
| Conjugated linoleic acid | 4.8 | 2.9 | 2.1 | 2.6 | 1.1 |
| Others | 7.3 | 14.6 | 12.6 | 7.8 | 11.9 |

The results show that a mixture of bromine and iodine is an effective catalyst for treating fatty acids. Also unexpectedly, substantially complete conversion using the mixed systems was obtained at lower catalyst levels than either iodine or bromine alone.

Upon distillation of a bromine-iodine disproportionated, distilled tall oil fatty acid (sample 6), the following analysis of the distilled fraction was obtained:

| Distillate | Sample 6 |
|---|---|
| Acid Number | 190.4 |
| Saponification Value | 192.1 |
| Color (Gardner) | 5 |
| % Diene (U.V.) | 5.1 |
| Yield | 75.1% |
| Titer (°C) | 21.0 |

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. The method of treating the linoleic acid portion of tall oil fatty acids which comprises, converting said linoleic acid portion to oleic acid by heating at a temperature between 400°F. and 550°F. in the presence of a bromine-iodine catalyst at a ratio of 1:1 to 5:1 bromine to iodine in an amount of 0.06 percent to 2.0 percent by weight of the fatty acids for 10 minutes to 6 hours.

2. The method of claim 1 wherein said bromine-iodine catalyst is present in an amount of 0.10 percent to 0.5 percent by weight of said fatty acids.

3. The method of claim 1 wherein the heating is carried out under a pressure between 10 p.s.i. and 40 p.s.i.

* * * * *

UNITED STATES PATENT OFFICE
CERTIFICATE OF CORRECTION

Patent No. 3,860,569     Dated January 14, 1975

Inventor(s) Benjamin F. Ward

It is certified that error appears in the above-identified patent and that said Letters Patent are hereby corrected as shown below:

Column 1, line 5, "Ser. No. 216,266" should read --Ser. No. 216,226--.

Column 1, line 11, "to" should be --of--.

Column 2, line 7, "disproprotionation" should be --disproportionation--.

Column 2, line 14, "U. S. Pat. No. 2,157,629" should be --U. S. Pat. No. 3,157,629--.

Column 2, line 50, "catalyst" should read --catalysts--.

Column 3, line 53, after the word "using" insert the word --a--.

Signed and sealed this 6th day of May 1975.

(SEAL)
Attest:

RUTH C. MASON
Attesting Officer

C. MARSHALL DANN
Commissioner of Patents
and Trademarks